(12) United States Patent
Ellsworth et al.

(10) Patent No.: US 6,513,030 B2
(45) Date of Patent: Jan. 28, 2003

(54) PERSISTENCE STORAGE ARCHITECTURE

(75) Inventors: William A. Ellsworth, Hampton Beach, NH (US); Ira Baron, Cambridge, MA (US)

(73) Assignee: Millennium Pharmaceuticals, Inc., Cambridge, MA (US)

( * ) Notice: Subject to any disclaimer, the term of this patent is extended or adjusted under 35 U.S.C. 154(b) by 0 days.

(21) Appl. No.: 09/912,218

(22) Filed: Jul. 24, 2001

(65) Prior Publication Data
US 2001/0044793 A1 Nov. 22, 2001

Related U.S. Application Data

(62) Division of application No. 09/167,702, filed on Oct. 7, 1998, now Pat. No. 6,266,672.

(51) Int. Cl.[7] .............................................. G06F 17/30
(52) U.S. Cl. ........................................ 707/2; 707/103 R
(58) Field of Search ........................... 707/2, 3, 4, 103; 709/231; 717/1

(56) References Cited

U.S. PATENT DOCUMENTS 6,324,682 B1 * 11/2001 McComb et al. ............... 717/1
6,332,163 B1 * 12/2001 Bowman-Amuah ......... 709/231
6,339,767 B1 *  1/2002 Rivette et al. .................. 707/2

* cited by examiner

Primary Examiner—Diane D. Mizrahi
(74) Attorney, Agent, or Firm—Fish & Richardson P.C.

(57) ABSTRACT

A method and system that processes a storage mechanism-independent query is described. The method and system identifies at least one persistent storage mechanism, that is capable of providing data for satisfying the query from among at least two persistent storage mechanisms. Data satisfying the query is derived from the identified persistent storage mechanisms.

17 Claims, 7 Drawing Sheets

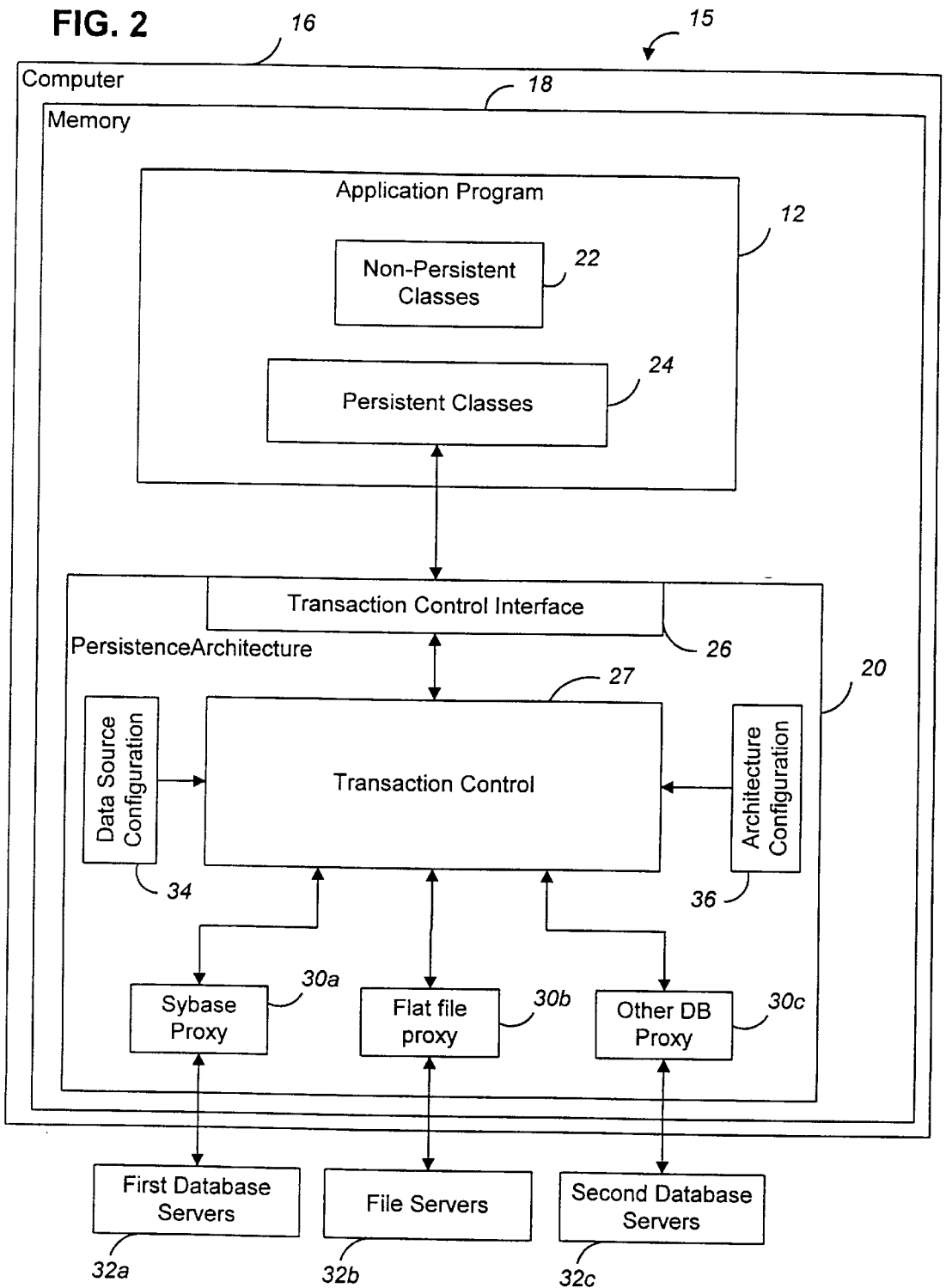

PERSISTENCE STORAGE ARCHITECTURE

This is a division of application Ser. No. 09/167,702, filed Oct. 7, 1998 now U.S. Pat. No. 6,266,672.

BACKGROUND OF THE INVENTION

The invention relates to computer systems for persistently storing data.

Computers typically store information persistently on a persistent storage medium such as a hard disk. Such a medium is called "persistent" because the data stored on it do not change unless and until they are explicitly modified by the computer. To modify persistently stored data, computers typically transfer the data from the persistent storage medium to a transient storage medium, such as a Random Access Memory (RAM). After changes are made to the data in the transient storage medium, the computer may replace the original data on the persistent storage medium with the modified data.

Application programs use a variety of mechanisms to store data persistently. Database systems, for example, typically provide interfaces that allow application programs to store, retrieve, and modify information in databases maintained by the database system. A database system typically has an interface specially designed for communicating with the database system. Different database systems typically provide different interfaces. Applications may also store information persistently in flat files using an interface provided by a file systems.

Object-oriented application programs typically model a problem domain using an "object model" that defines classes of objects representing elements of the problem domain. A class definition defines the class in terms of (1) the relationship of the class to other classes, (2) the data associated with objects in the class, (3) the operations that can be performed on objects in the class. During execution of an object-oriented application program, instances of the classes in the object model, referred to as "objects," are produced and manipulated. For example, software used for biotechnology research might model individual genomes, genes, markers, chromosomes, genotypes, and alleles as objects of different classes. It is often desirable to persistently store representations of such objects.

SUMMARY OF THE INVENTION

The invention provides a persistence architecture that allows application programs to transparently access multiple persistent storage mechanisms through a single interface. The persistence architecture may be used, for example, by object-oriented application programs to persistently store objects. To carry out persistent storage transactions (e.g., store, retrieve, and modify), application programs make calls to methods provided by the persistence architecture rather than to routines provided by the interfaces of the underlying persistent storage mechanisms. Prior to running an object-oriented application program which uses a particular object model, the persistence architecture is configured to map object classes in the object model to particular persistent storage mechanisms. When the application program executes and makes calls to persistence architecture methods, the persistence architecture carries out the necessary transactions with the appropriate persistent storage mechanisms. In this way, the application program remains independent of the underlying persistent storage mechanisms used to store the application's objects.

According to an aspect of the invention, a method for processing a storage mechanism-independent query includes identifying at least one persistent storage mechanism, from among at least two persistent storage mechanisms, that is capable of providing data for satisfying the query and deriving, from the identified persistent storage mechanisms, data satisfying the query.

According to an additional aspect of the invention, a method for reflecting a change to the state of a storage-mechanism independent data structure in persistent storage media comprises identifying at least one persistent storage mechanism, from among at least two persistent storage mechanisms for storing information on the persistent storage media, that is designated for reflecting the state of the data structure and engaging in physical transactions with the identified persistent storage mechanisms to reflect the change to the state of the data structure.

According to an additional aspect of the invention, a computer program product residing on a computer readable medium for processing a storage mechanism-independent query, the computer program product comprising instructions for causing a computer to identify at least one persistent storage mechanism, from among at least two persistent storage mechanisms, that is capable of providing data for satisfying the query and derive, from the identified persistent storage mechanisms, data satisfying the query.

The invention provides several advantages. One advantage is that the persistence architecture de-couples an application's object model from the persistent storage mechanisms used to persistently store objects in the object model. A number of benefits result from this de-coupling. Development of object models can take place independently of the establishment of mappings between objects in the object models and persistent storage mechanisms. As a result, application programmers can design object models without knowing which persistent storage mechanisms will be used to store objects in the object model. Mappings between object classes and persistence storage mechanisms may, for example, be established after object models have been designed. Furthermore, the tasks of object model design and persistent storage mapping can be assigned to different programmers or organizational units.

Similarly, an established mapping between object classes and persistent storage mechanisms can be changed without requiring changes to be made to object models or to the application programs that deploy them. Because mappings may be changed at runtime, changes to mappings need not require re-compilation or re-linking of application programs.

Another advantage of the persistence architecture is that it allows objects to be distributed across persistent storage mechanisms in a way that is transparent to application programmers. For example, different object classes in an object model may be persistently stored using different database systems. Similarly, data contained in a single object may be spread across multiple database systems. The application programmer implements persistent storage capabilities in an application using the interface provided by the persistence architecture, without regard to the way in which objects and object classes are distributed among persistence mechanisms. As a result, the distribution of objects and object classes can change without requiring changes to application programs using the persistence architecture.

The ability to distribute data across multiple persistent storage mechanisms and to change the distribution of data is particularly advantageous when different persistent storage mechanisms are best-suited for different kinds of data or for different applications. In such cases, the persistence architecture may be configured to persistently store each kind of data using an optimal persistent storage mechanism. This allows applications to take advantage of the strengths of different persistent storage mechanisms without being tightly coupled to the particular interfaces provided by the different persistent storage mechanisms.

By providing a common interface between application objects and multiple persistent storage mechanisms, the persistence architecture reduces overall application development time by allowing application developers to focus on designing object models, rather than on the details of persistent storage. Furthermore, the persistence architecture reduces training time because it does not require application programmers to be familiar with multiple persistent storage mechanism interfaces. If the persistence architecture is used for all persistent storage within an application or within a suite of applications, application programmers need only learn the protocol of the persistence architecture, regardless of which or how many underlying persistent storage mechanisms are used for persistent storage. Specific object-to-storage medium mappings are left to the persistence architecture and are hidden from the application programmer. After an application programmer has learned how to use the persistence architecture to persistently store objects, the programmer can use the same knowledge to incorporate persistent storage capabilities into many applications without additional training.

Unless otherwise defined, all technical and scientific terms used herein have the same meaning as commonly understood by one of ordinary skill in the art to which this invention belongs.

The techniques described below may be implemented in computer hardware or software, or a combination of the two. However, the techniques are not limited to any particular hardware or software configuration; they may find applicability in any computing or processing environment that may be used for persistent storage of data. Preferably, the techniques are implemented in computer programs executing on programmable computers that eachinclude a processor, a storage medium readable by the processor (including volatile and non-volatile memory and/or storage elements), at least one input device, and one or more output devices. Program code is applied to data entered using the input device to perform the functions described and to generate output information. The output information is applied to the one or more output devices.

The techniques described below are preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will be apparent from the following detailed description, and from the claims.

BRIEF DESCRIPTION OF THE DRAWINGS

FIG. 2 is a block diagram of a computer system implementing the persistence architecture.

DETAILED DESCRIPTION

Figure 1:
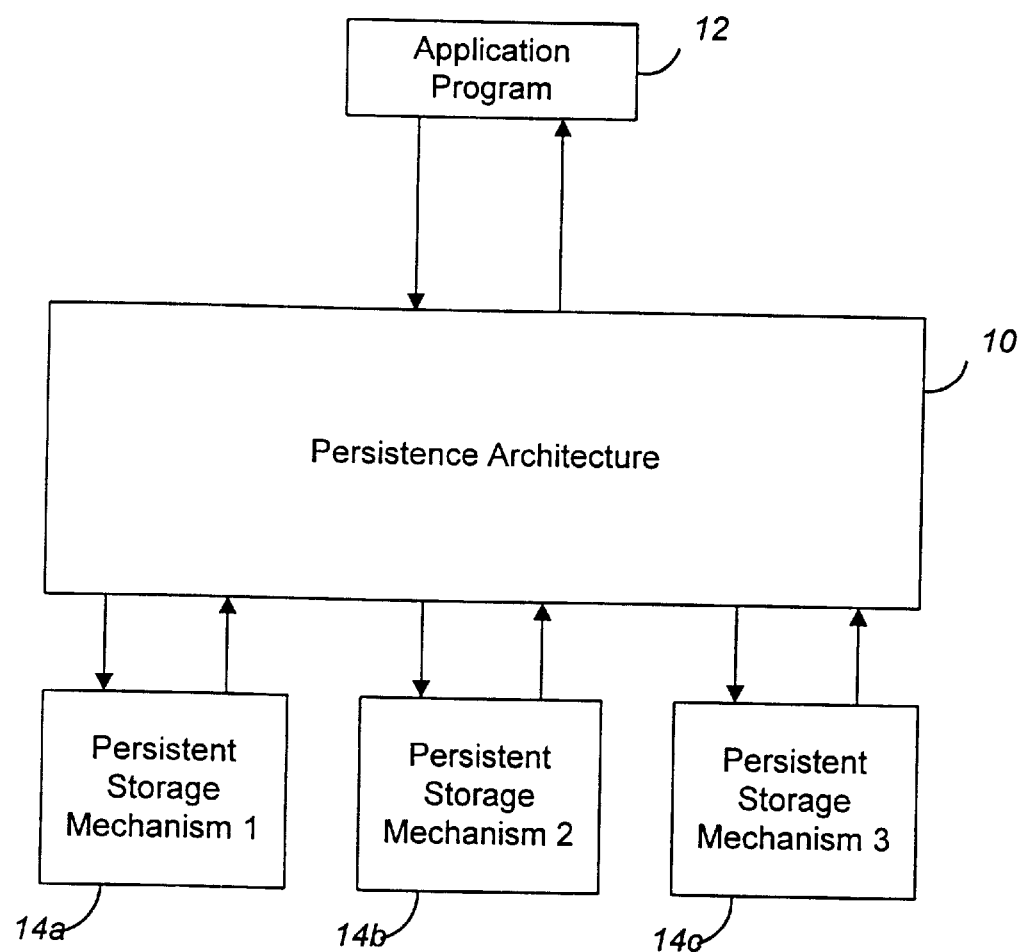
FIG. 1 is a block diagram of the architecture of the persistence architecture.

Referring to FIG. 1, a persistence architecture 10 provides an interface between an application program 12 and persistent storage mechanisms 14a–14c. To store, retrieve, modify, or delete information using one of the persistent storage mechanisms 14a–14c, the application program 12 engages in a transaction with the persistence architecture 10 using an interface (not shown) provided by the persistence architecture 10. The persistence architecture 10, in turn, interacts with the persistent storage mechanisms 14a–14c using interfaces (not shown) provided by the respective persistent storage mechanisms 14a–14c to carry out the application program's instructions. The persistent storage mechanisms 14a–14c may be, for example, servers which interface with databases, file systems, etc., that are for use by the application program 12. Because the application program 12 only interacts directly with the persistence architecture 10, the application program 12 can be designed and implemented without regard to which or how many persistent storage mechanisms are used to provide persistent storage.

Referring to FIG. 2, a system 15 incorporating the persistence architecture 10 has an application program 12 that resides in a main memory 18 of a computer 16. The application program contains both non-persistent classes 22 and persistent classes 24. The persistent classes 24 take advantage of the persistence architecture's persistent storage capabilities, as described in more detail below. A persistence architecture object 20 residing in memory 18 provides persistent storage capabilities to the application program 12 and to other application programs (not shown). Although in the following discussion the persistence architecture 10 is implemented in the Smalltalk programming language, this is for purposes of example only. For example, it could be implemented in other languages such as Java™, Sun Microsystems, Palo Alto, Calif., e.g., Visual Works® by Park Place-Digitalk, Inc., Sunnyvale, Calif.

Persistent classes 24 in the application program 12 communicate with the persistence architecture object 20 through a transaction control interface 26. The transaction control interface 26 includes a group of methods that operate on transaction objects and is coupled to a transaction control module 27. Transaction control module 27 being for example, a transaction object 28 discussed below, communicates with persistent storage mechanisms 32a–32c through persistent storage mechanism proxies 30a–30c. For example, the transaction control module 27 communicates with a first type of database servers (i.e., Sybase® databases, Sybase, Inc.) 15a through a Sybase® proxy 30a. The Sybase proxy 30a is configured specifically to communicate with the first database type servers 32a serving Sybase® databases. Similarly, the flat file proxy 30b is configured specifically to communicate with file servers 32b, and the other database proxy 30c is configured specifically to communicate with second database servers 32c serving databases other than Sybase® databases.

The persistence architecture object 20 contains data source configuration data 34 for specifying the source persistent storage mechanism and destination persistent storage mechanism for each of the persistent classes 24, and architecture configuration data 20. The purpose of the architecture configuration data is to configure the proxy with the name of the server that the proxy communicates with. Each of the database servers are configured with unique configuration data that is obtained from the persistence architecture 10.

Figure 3A:
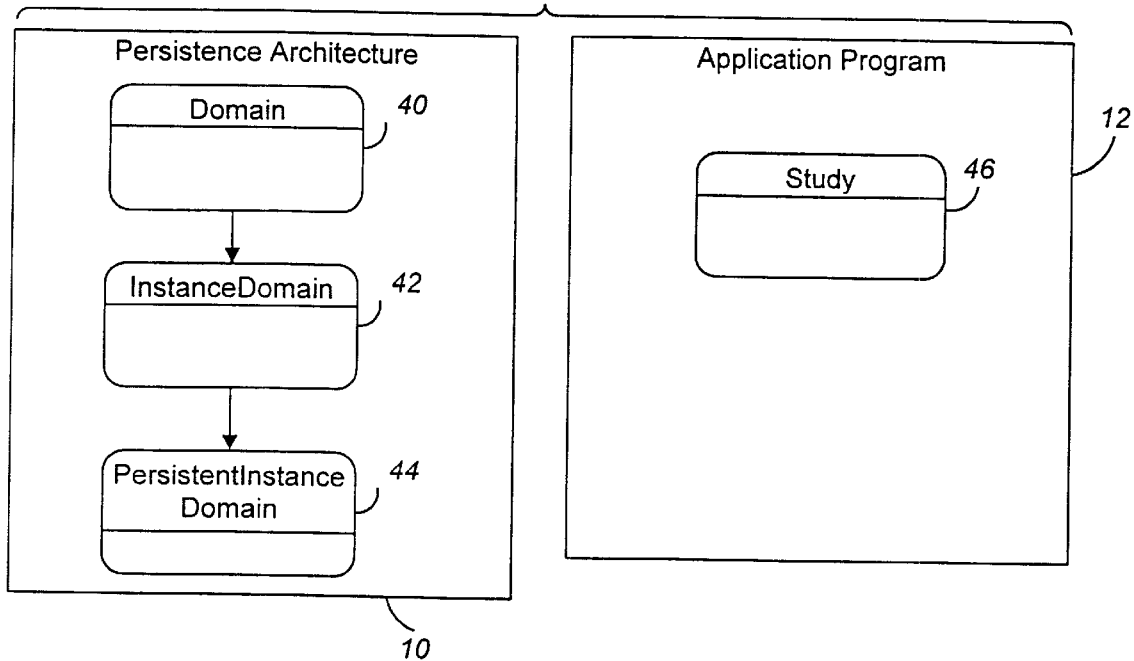
FIG. 3A is a block diagram of persistence architecture classes and an application class.
Figure 3B:
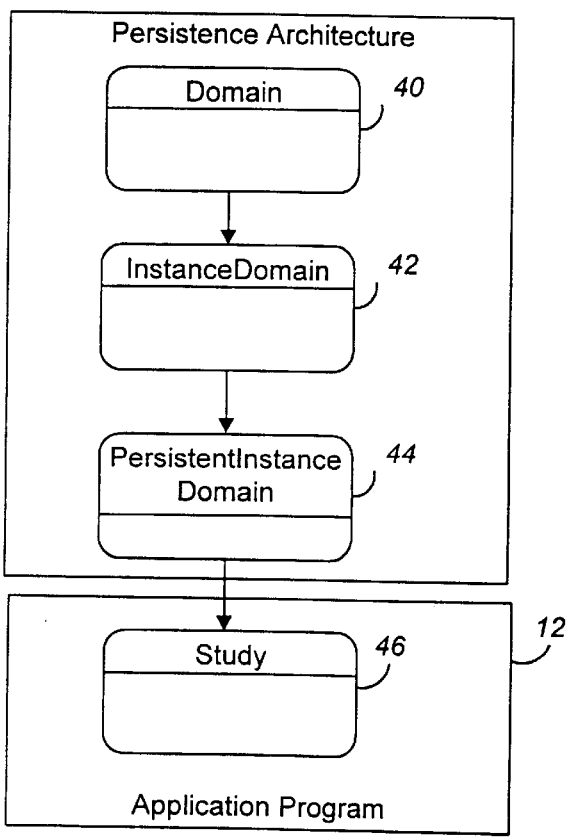
FIG. 3B is a block diagram of an inheritance relationship between an application class and persistence architecture classes.

Referring to FIG. 3A, the persistence architecture 10 includes a class PersistentInstanceDomain 44 that provides methods for object retrieval and object mutation (e.g., insert, update, and delete). For a class to implement persistent storage, the class incorporates the methods of PersistentInstanceDomain by inheritance. For example, as shown in FIG. 3A, the application program 12 includes a class Study 46. As shown in FIG. 3B, to make Study 46 a persistent class, the application programmer alters Study 46 so that it inherits from PersistentInstanceDomain 44. The class Study 46 therefore inherits the persistence-related methods of PersistentInstanceDomain 44. PersistentInstanceDomain 44 inherits from InstanceDomain 42, which inherits from Domain 40. These two classes InstanceDomain 42 and Domain 40 are used internally by the persistence architecture 10 and need not concern the application programmer. Class InstanceDomain 42 maintains a per class instance of configuration data i.e., containing references to proxy for the class, whereas PersistentInstanceDomain 44 can be used for expanding future functionality.

Other ways of providing application classes such as Study 46 with persistent behavior are possible in other programming languages. For example, in C++, multiple inheritance could be used to allow a class such as Study 46 to inherit both from PersistentInstanceDomain 44 and from any classes from which Study previously inherited. In Java, for example, PersistentInstanceDomain 44 could be an Interface, and a class such as Study 46 could implement the PersistentInstanceDomain Interface.

Object Retrieval

The PersistentInstanceDomain class 44 provides any class which inherits from it with methods for retrieving from persistent storage instances of the class which satisfy specified criteria. These include, for example, methods for retrieving: (1) all instances of the class, (2) instances of the class for which a particular attribute is equal to, greater than, or less a specified value, (3) instances for which a particular attribute has a value that is contained in a specified list of values, and (4) instances which satisfy a Structured Query Language (SQL) query.

Figure 4:
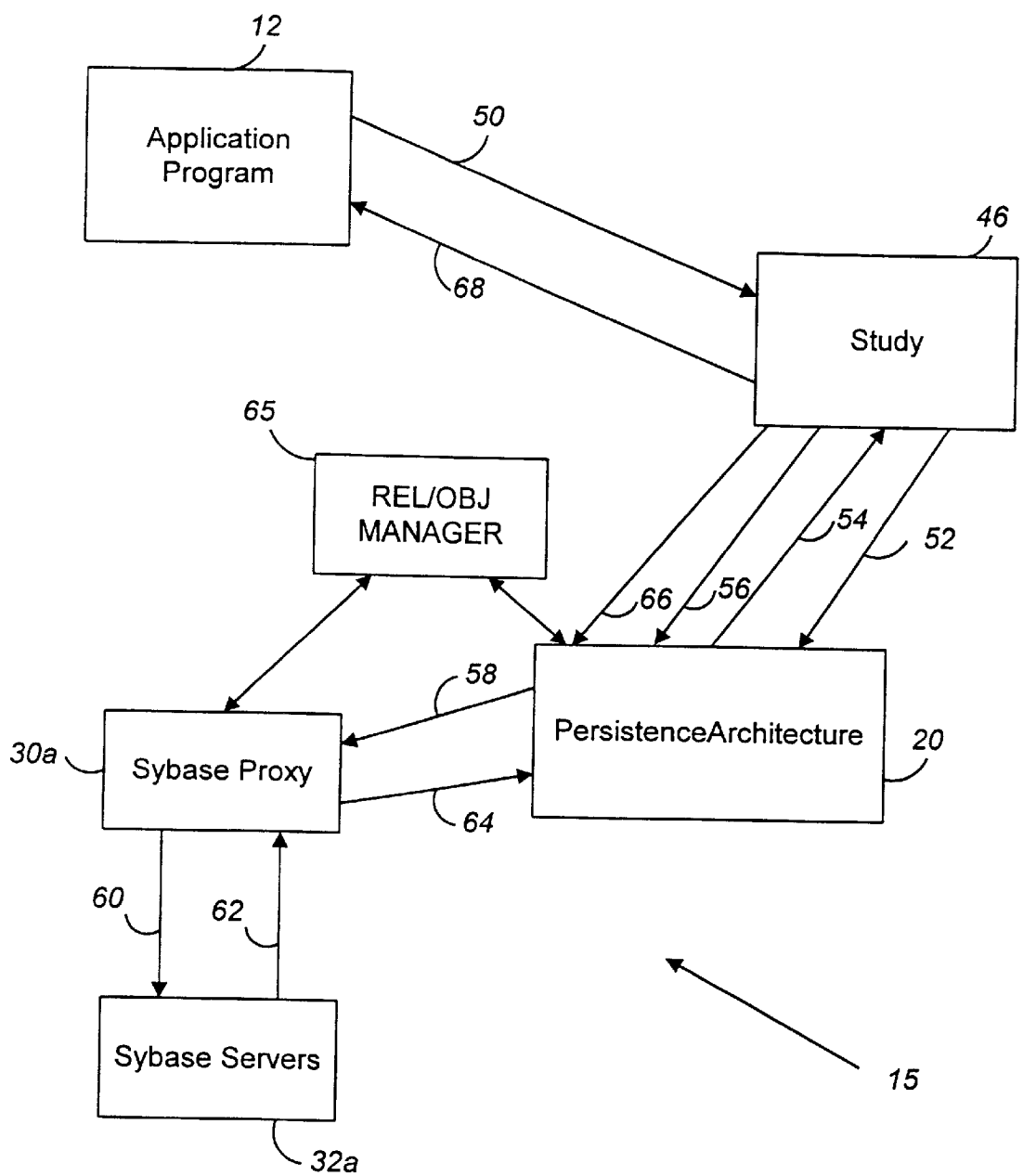
FIG. 4 is a diagram of object retrieval using the persistence architecture.

Referring to FIG. 4, the application program 12 can locate and/or retrieve from persistent storage instances of the class Study 46 having an identification ("id") attribute equal to, e.g., 1. To accomplish this, the application program 12 sends the following Smalltalk message 50 to the class Study 46:

getwith: #id equalTo: 1

In FIG. 4 and in subsequent figures, an arrow from a first block to a second block represents a method call (or message) from the class or object represented by the first block to the class or object represented by the second block.

The class Study 46 sends the following message 52 to the PersistenceArchitecture object 20 requesting all Study objects that match the selection criteria (id=1):

get: Study with: #id equalTo: 1

The PersistenceArchitecture object 20 sends a message 54 to the class Study 46 which effectively asks which of the persistent storage mechanism proxies 30a–c is used to access instances of the class Study 46. Class Study 46 is initialized with knowledge of which proxy is used to store Study objects by the configuration data when the application initially executes. The class Study 46 responds by sending a message 56 to the PersistenceArchitecture object 20 indicating which of the persistent storage mechanism proxies 30a–c to use. For purposes of discussion, assume that all instances of the class Study 46 are stored on database servers 32a which run on a Sybase database, and which are therefore accessed using the Sybase proxy 30a. The PersistenceArchitecture object 20 sends a message 58 that asks the Sybase proxy 30a for all instances of the class Study 46 that match the selection criteria. The Sybase proxy 30a sends a request 60 to one or more of-the database servers 32a for records matching the selection criteria, and the Sybase servers 32a send a response 62 indicating which records match the selection criteria. The Sybase proxy 30a sends a message 64 to the PersistenceArchitecture object 20 which incorporates the matching objects by reference or by value.

The PersistenceArchitecture object 20 forwards 66 the proxy's response to the class Study 46, which in turn forwards 68 the response to the application program 12. As a result, the application program holds a reference to zero or more Study objects which match the selection criteria.

The system 15 also includes a middleware program and an object mapper 65 that performs object relational mapping to database tables. This program is responsible for generating objects based on the information retrieved from the database. One example of a preferred program is an object relational mapper known as "Toplink" from Object People, Inc. Ottawa, Ca.

The object relational mapper 65 is responsible for converting objects into data capable of being stored in a database and vice versa. In the object relational mapper 65 14 an object class is mapped to tables for the persistent storage mechanism and attributes are mapped to columns and fields in the database.

Transaction Management

A "transaction" is an atomic series of operations that may result in changes to object states. In other words, the object state changes caused by the actions in a transaction only take effect if the entire transaction completes successfully. If any part of the transaction fails, or if the transaction is aborted before it is complete, the state of the objects affected by the transaction are restored to the state they were in before the transaction began.

As used herein, a "logical transaction" refers to a transaction between an application program and the persistence architecture 10 (FIG. 1). Logical transactions only affect the transient state of objects and are not reflected in changes made to objects in persistent storage. Application programs engage in logical transactions with the PersistenceArchitecture object 20 when performing groups of operations which potentially change object states. Decisions regarding how and when to group operations into a logical transaction are left to the application programmer.

Figure 5:
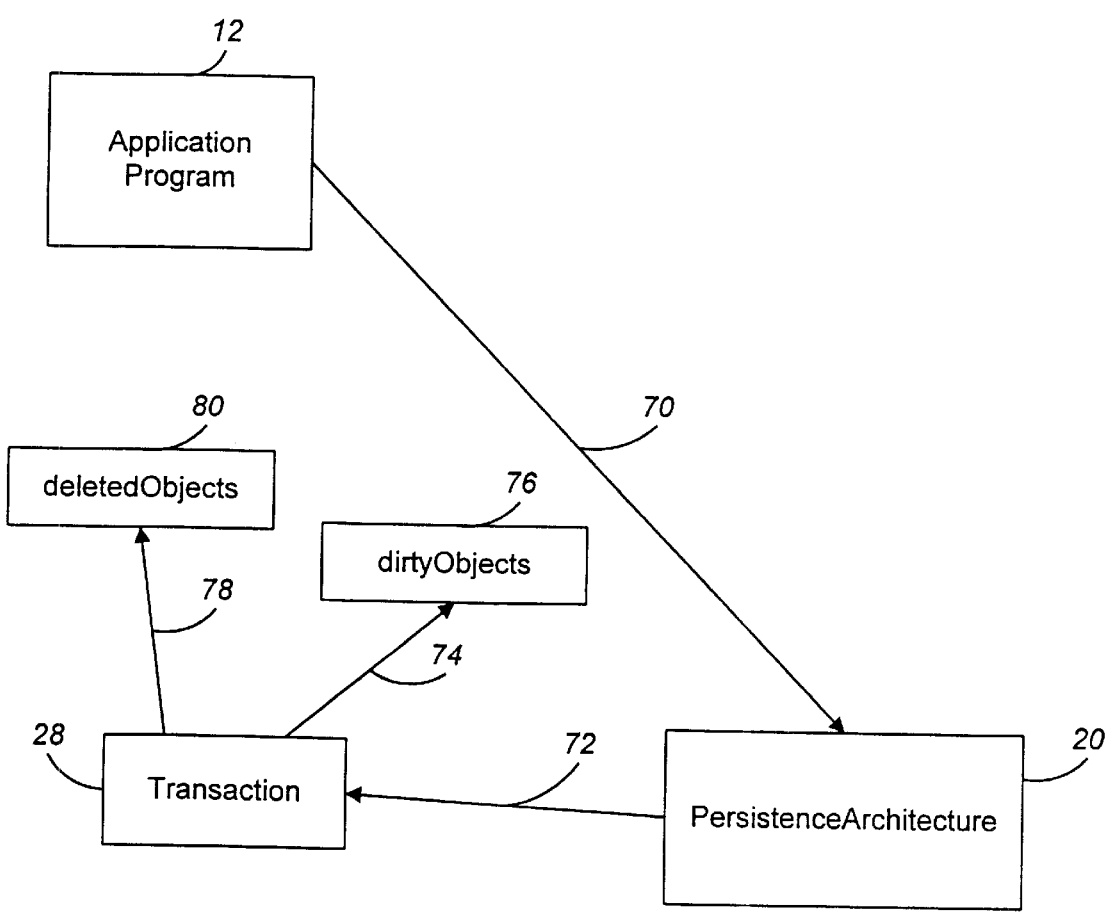
FIG. 5 is a diagram of transaction initialization using the persistence architecture.

Referring now to FIG. 5, the application 12 signals the beginning and end of a transaction to the PersistenceArchitecture object 20, which manages the transaction.

As used herein, a "physical transaction" refers to a transaction between the persistence architecture 10 and one of the persistent storage mechanisms 14a–14c. Physical transactions affect the state of objects in persistent storage, and are typically used to make objects' persistent state consistent with their transient (logical) state.

Logical transactions are managed 71 by the PersistenceArchitecture object's Transaction object 28. The Transaction object 28 is generated and initialized when the PersistenceArchitecture object 20 is initialized. The Transaction object 28 provides application developers with three methods for managing logical transactions: (1) beginTxn, for initializing the Transaction object 28 in preparation to begin a logical transaction, (2) commitTxn, to commit all activity performed during a logical transaction to persistent store(s), and (3) abortTxn, to restore all persistent objects to the state they were in before the most recent beginTxn.

During a logical transaction, the Transaction object 28 maintains two collections of objects: (1) dirtyObjects, which references persistent objects that were marked as dirty (as a result of a change in state) during the logical transaction, and (2) deletedobjects, which references objects that were marked as deleted during the logical transaction.

A logical transaction is initialized as follows. The application 12 sends a message to the PersistenceArchitecture object 20 to begin (initiate) a new logical transaction by sending it a beginTxn message. The PersistenceArchitecture object 20 instructs 72 its Transaction object 28 to begin a new logical transaction. The Transaction object 28 sends a message 74 to its dirtyobjects collection 76 to empty itself, and tells 78 its deletedobjects collection 80 to empty itself. The transaction is now initialized.

The application program 12 performs the operations comprising the logical transaction, which may include retrieving, storing, deleting, and modifying objects. The PersistenceArchitecture object 20 monitors deletion of objects and changes to object states, as will be described below with respect to FIG. 7.

Figure 6:
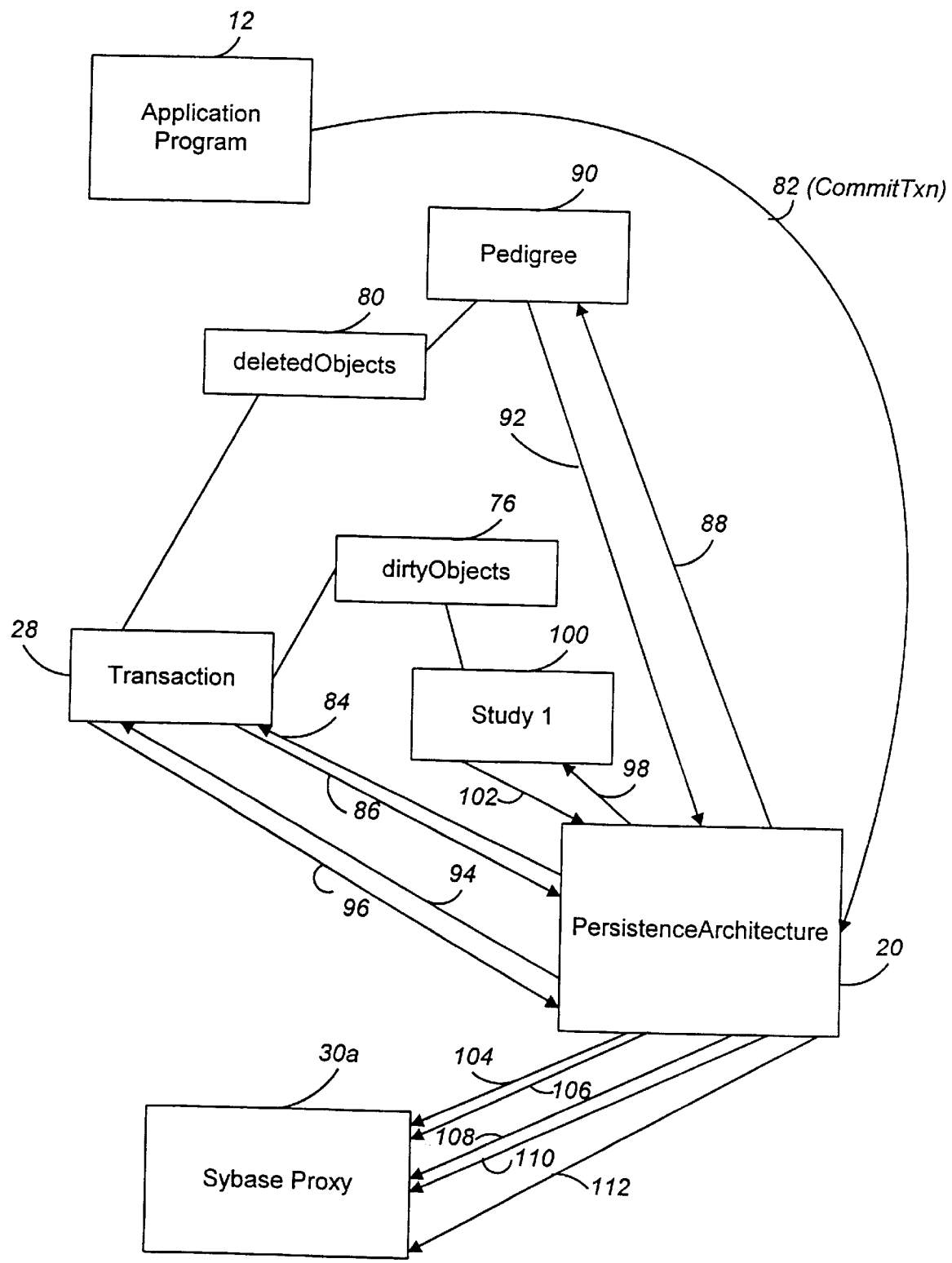
FIG. 6 is a diagram of transaction commit using the persistence architecture.

Referring to FIG. 6, physical transaction management 81 is shown. When the application program 12 wants to commit the logical transaction (i.e., to make the current state of its object model be reflected in persistent storage), the application program 12 sends 82 a commitTxn message to the PersistenceArchitecture object 20. The commitTxn message is sent to make persistent all changes to object states (including object deletions) that occurred since the logical transaction began. The PersistenceArchitecture object 20 asks 84 for and receives 86 a reference to its Transaction object's deletedobjects collection 80. The PersistenceArchitecture object 20 asks 88 each object in the deletedobjects collection 80 for the persistent storage mechanism proxy that is used to store it. In the example of FIG. 6, the only object in the deletedobjects collection 80 is a Pedigree object 90. In response to the request, the Pedigree object 90 responds with a message 92 to the PersistenceArchitecture object 20 identifying that the Pedigree object 90 is stored using the Sybase proxy 30a. The PersistenceArchitecture object 20 adds all persistent storage mechanism proxies received from objects in the deletedobjects collection 80 to a list of persistent storage mechanism proxies. In the example of FIG. 6, the only such persistent storage mechanism proxy is the Sybase proxy 30a.

The PersistenceArchitecture object 20 asks for 94 and receives 96 a reference to the Transaction object's dirtyObjects collection 76. The PersistenceArchitecture object 20 asks 98 each object in the dirtyObjects collection 76 for the persistent storage mechanism proxy that is used to store it. In this example, the only object in the dirtyobjects collection 76 is a Study object 100, which tells 102 the PersistenceArchitecture object 20 that it is stored using the Sybase proxy 30a. The PersistenceArchitecture object 20 adds all persistent storage mechanism proxies received from objects in the dirtyobjects collection 76 to the list of persistent storage mechanism proxies. In this example, the only such persistent storage mechanism proxy is the Sybase proxy 30a.

The PersistenceArchitecture object 20 instructs 104 each of the persistent storage mechanism proxies in the list of persistent storage mechanism proxies (in this case, only the Sybase Proxy 30a) to begin a physical transaction. The PersistenceArchitecture object 20 instructs 104 the Sybase Proxy 30a to delete the Pedigree object 90, and instructs 108 the Sybase Proxy 30a to save the Study object 100. The PersistenceArchitecture object 20 asks 110 the Sybase Proxy 30a if it is prepared to commit its physical transaction. If it is, the PersistenceArchitecture instructs 112 the Sybase Proxy 30a to commit the physical transaction.

Oblect State Management

The PersistentInstanceDomain class 44 also provides methods for making changes to the state of objects and for deleting objects. Calls to these methods result in objects being placed in the Transaction object's deletedObjects and dirtyobjects collections, as appropriate. That is, the object management process encapsulates attribute mutation, i.e., it detects mutations at the attribute level rather than just the object level. By tracking changes at the attribute level, (i.e., atomic updates) updating of the data bases are made easier as there is less information that needs to be transmitted and accessed.

Object mutation (i.e., changing the state of an object) is accomplished by sending a Smalltalk "recordChanged:was" method to the object. Therefore, any class that inherits from the class PersistentInstanceDomain 44 must have its instance mutator methods changed to include the following method invocation:

self recordChanged: #<ivar> was: <ivar> where #<ivar> identifies the attribute of the instance that was changed, and where <ivar> identifies the previous-value of the attribute. The marking of an object as dirty is transparent to the application program 12. The recordChanged:was: method should only be invoked in object mutator methods.

Object deletion (i.e., removal of an object from persistent storage) is accomplished by sending a "markDeleted" message to the object to prepare the object for deletion. The corresponding Smalltalk code is a study marked deleted is accomplished by sending a mark delete message. Unlike object mutation, the application must keep track of objects' transition to the state of "deleted." The application needs to keep track of the state because the object may or may not exist based upon the specifics of the application program.

Figure 7:
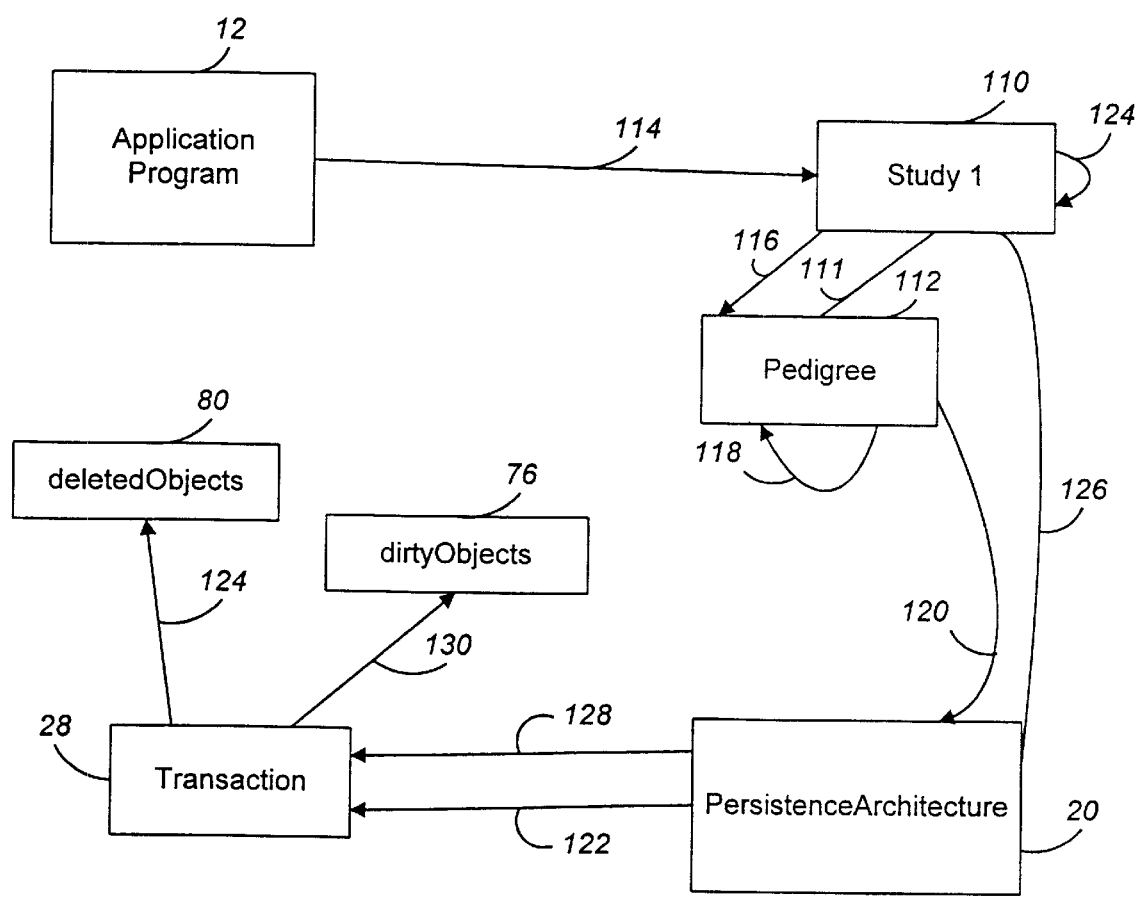
FIG. 7 is a diagram of object state management using the persistence architecture.

Referring to FIG. 7, object state management 101 is shown. A Study object 110 holds a reference 111 to a Pedigree object 112. The application program 12 sends a removePedigree message 114 to the Study object 110 asking it to release its reference to the Pedigree object 112. Since the Study object 110 is in a wholly-owned relationship with the Pedigree object 112 (i.e., the Study object 110 is the only object that can hold a reference to the Pedigree object 110), the Study object 110 sends a markDeleted message 116 to the Pedigree object 112 asking the Pedigree object to delete itself. The Pedigree object 112 tells 118 itself to mark itself as deleted.

The markDeleted method is a method of PersistentInstanceDomain which, in turn, calls 120 the PersistenceArchitecture object 20, asking it to delete the Pedigree object 112. The PersistenceArchitecture object 20 sends a message 122 to the Transaction object 28 asking it to mark the Pedigree object 112 as deleted. The Transaction object 28 sends a message 124 to add the Pedigree object 112 to its deletedObjects collection 80.

Removing the Study object's reference to the Pedigree object 112 results in a change to the Study object's state. The Study object 110 therefore sends a markDirty message 124 to itself to mark itself as dirty. The definition of relationship in the domain specifies that the deletion of a container object makes the container dirty. Therefore, the container is marked as dirty. The markDirty method is a method of PersistentInstanceDomain which, in turn, asks 126 the PersistenceArchitecture object 20 to persistently store the new state of the Study object 110. The PersistenceArchitecture object 20 asks 128 the Transaction object 28 to mark the Study object 110 as dirty. The Transaction object 28 adds 130 the Study object 110 to its dirtyobjects collection 76. As a result, the Pedigree object 112 is contained in the deletedObjects collection 80 and the Study object 110 is contained in the dirtyObjects collection 76.

Other Embodiments

The application program 12 and the PersistenceArchitecture object 20 need not both reside in the memory 18. They may reside in different memories on different computers, as long as they can communicate with each other as described above. For example, the application program 12 may reside on a client workstation and the PersistenceArchitecture object 20 may reside on a server. Multiple application programs may share the same PersistenceArchitecture object, or there may be a PersistenceArchitecture object for each application program. There may be any number of persistence mechanisms 14a–c, which may be any combination of database systems, file systems, and/or other suitable systems.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for processing a storage mechanism-independent query, the method comprising:
   identifying at least one persistent storage mechanism, from among at least two persistent storage mechanisms, that is capable of providing data for satisfying the query, wherein data comprise instances of a class in an object-oriented computer system, and identifying is based on information, obtained from the class, specifying the at least one persistent storage mechanism;
   deriving, from the identified persistent storage mechanisms, data satisfying the query.

2. The method of claim 1, wherein persistent storage mechanisms comprise database systems.

3. The method of claim 1, wherein persistent storage mechanisms comprise file systems.

4. The method of claim 1, wherein data satisfying the query comprise instances of a class in an object-oriented computer system.

5. The method of claim 1, wherein the query requests all instances of the class.

6. The method of claim 1, wherein the query requests instances of the class for which a value of an attribute satisfies a specified condition.

7. The method of claim 1, wherein the query comprises a Structured Query Language query.

8. The method of claim 4, wherein identifying comprises identifying the persistent storage mechanisms based on information associated with the class.

9. The method of claim 8, wherein identifying comprises obtaining the information associated with the class from a class object representing the class.

10. The method of claim 1, wherein the information associated with the class is descriptive of proxies for the identified persistent storage mechanisms.

11. The method of claim 1, wherein deriving comprises engaging in physical transactions with the identified persistent storage mechanisms.

12. The method of claim 11, wherein engaging in physical transactions comprises:
   converting the query into queries directed to the identified persistent storage mechanisms;
   forwarding the queries to the identified persistent storage mechanisms; and
   receiving query results from the identified persistent storage mechanisms.

13. The method of claim 11, wherein engaging in physical transactions further comprises converting the query results into data satisfying the query.

14. The method of claim 4, wherein the queries are directed to persistent storage mechanism proxies for the identified persistent storage mechanisms, and the method further comprises:
   forwarding the queries to the identified persistent storage mechanisms through the persistent storage mechanism proxies; and
   receiving comprises receiving query results from the identified persistent storage mechanisms through the persistent storage mechanism proxies.

15. The method of claim 14, wherein forwarding the queries through the persistent storage mechanism proxies comprises:
   sending the queries to the persistent storage mechanism proxies;
   converting the queries into storage mechanism-dependent queries; and
   sending the storage mechanism-dependent queries to the persistent storage mechanisms.

16. The method of claim 1, further comprising:
   configuring a transaction control interface with data source and control configuration data.

17. A computer program product residing on a computer readable medium for processing a storage mechanism-independent query, the computer program product comprising instructions for causing a computer to:
   identify at least one persistent storage mechanism, from among at least two persistent storage mechanisms, that is capable of providing data for satisfying the query, wherein data comprise instances of a class in an object-oriented computer system, and identifying is based on information, obtained from the class, specifying the at least one persistent storage mechanism; and
   derive, from the identified persistent storage mechanisms, data satisfying the query.

* * * * *